June 21, 1955 G. R. MARLETTE 2,711,090
PLATE AND WRAP YARN CONTROL MEANS AND METHOD
Filed Oct. 25, 1952 10 Sheets-Sheet 3

Fig-3

GOLEY R. MARLETTE
INVENTOR.

BY Eaton & Bell

ATTORNEYS.

June 21, 1955  G. R. MARLETTE  2,711,090
PLATE AND WRAP YARN CONTROL MEANS AND METHOD
Filed Oct. 25, 1952  10 Sheets-Sheet 5

INVENTOR:
GOLEY R. MARLETTE.
BY Eaton & Bell
ATTORNEYS.

June 21, 1955 G. R. MARLETTE 2,711,090
PLATE AND WRAP YARN CONTROL MEANS AND METHOD
Filed Oct. 25, 1952 10 Sheets-Sheet 8

GOLEY R. MARLETTE,
INVENTOR.

BY
ATTORNEYS.

June 21, 1955     G. R. MARLETTE     2,711,090
PLATE AND WRAP YARN CONTROL MEANS AND METHOD
Filed Oct. 25, 1952     10 Sheets-Sheet 9

INVENTOR:
GOLEY R. MARLETTE.

BY Eaton & Bell
ATTORNEYS.

United States Patent Office 2,711,090
Patented June 21, 1955

2,711,090

PLATE AND WRAP YARN CONTROL MEANS AND METHOD

Goley R. Marlette, High Point, N. C., assignor to Adams-Millis Corporation, High Point, N. C., a corporation of North Carolina Application October 25, 1952, Serial No. 316,852

17 Claims. (Cl. 66—50)

This invention relates to a circular knitting machine and more especially to a circular knitting machine equipped with wrap feeding means for feeding wrap threads to selected needles, and it is the primary object of this invention to provide improved sinker control means so arranged that all of the sinkers are of the reverse plating type. The machine is also equipped for feeding backing yarns and facing yarns so that the backing yarn is fed under high tension while the facing yarn is fed under lesser tension, thus insuring that the facing yarn is not bound or imbedded in the backing yarn, causing it to stand out more clearly in the making of patterns and the like.

Also, since the backing yarn is fed under high tension, in the event that a wrap thread is deposited around certain needles, it causes the wrap thread to stand out in front of the facing yarn, since the wrap thread will not be under as great a tension as the facing yarn and the backing yarn, being under high tension, will therefore not interfere with the standing out of the wrap thread when such is used in certain wales and courses of the stocking. If desired, the main facing or plating yarn can be floated where the wrap yarn is employed and the wrap yarn will then be disposed on the outside of the backing yarn.

Another important object of this invention is to provide a knitting machine with all sinkers being reverse plating sinkers and means for operating the same whereby, before the knitting wave is reached, all of the sinkers will be fully advanced inwardly to cause the facing yarn and backing yarn, and a wrap yarn, if used, to be deposited on the outer portions of the nibs of the sinkers and, when the knitting wave is reached, all of the loops will be drawn while disposed on the tops of the sinkers outwardly of the nibs. After all of the needles have been moved to their lowest position in the knitting wave, forming the loops on the backs of the sinkers, then, at a point further on in the revolution of the needles, the needles are raised about half way up toward their highest points and all of the sinkers are retracted or moved radially outwardly to cause all of the loops formed on the backs of the sinkers to ride up over the nibs of the sinkers and be deposited on the front portions or knitting platform portions of the sinkers.

Immediately thereafter, the needles are lowered to bring the loops which have been slid over the nibs of the sinkers down firmly onto the tops of the front portions of the sinkers, sometimes referred to as the platform portions of the sinkers; then the sinkers are advanced inwardly to engage the loops just formed, and which are then resting on the platform portions of the sinkers, to insure that all of the loops of the course just knitted will be disposed underneath the nibs of the sinkers. After the needles have been lowered to cause the loops to be deposited under the nibs of the sinkers, they remain in this lowered position for a few degrees in movement thereof after which they engage a clearing cam at which point the needles are raised to their full height at the conventional point on the machine where they have heretofore been raised to their full height, the sinkers still retaining the fabric under their nibs. The sinkers remain in their innermost position during the remainder of the revolution of the needle cylinder until these needles approach the throat plate of the machine.

In my former patent, No. 2,528,067, of October 31, 1950, there is disclosed a plating method and means for a circular knitting machine, equipped with special sinkers and a peculiar manner of feeding the backing yarn and facing yarn so that the backing yarn is fed under high tension while the facing yarn is fed with less tension, thus causing the facing yarn not to bind or embed itself in the backing yarn and causing it to stand out more clearly in the making of patterns and the like.

A great improvement is herein shown in the method of plating disclosed in my said patent, while retaining the object of the peculiar manner of feeding the backing yarns and facing yarns, whereby the backing or body yarn, in certain pattern areas having the facing or plating yarn floated behind the body yarn, will be tightly knit even though the body yarn alone is being knit. By the present herein disclosed apparatus a much tighter stitch is secured which eliminates, to a marked degree, the appearance on the fabric of what is known as sinker prints or improper plating. By this improved apparatus herein shown, including the use of all plating sinkers, a much heavier backing yarn and facing yarn may be employed than has heretofore been possible without any danger of cutting the fabric due to what is known as weaving of the sinkers.

Every object of this invention is to have every sinker a reverse plating type sinker and means for operating the same whereby every sinker, each of which is provided with an outwardly and downwardly sloping portion on the outer portion of its nib, will cause the backing and facing yarns and the wrap yarn, when used, to slide down the sloping surface of the shoulder of the nibs as the needles are lowered to cause the backing yarn to be on the outermost portion of the tops of the sinkers during the final drawing of the stitches while the facing yarn and/or wrap yarn, when used, will appear next to the shoulder of the nibs of the sinkers and, thus, will stand out boldly and distinctly and under less tension on the surface of the fabric being knitted without vertical lines or alternate sinker prints in the fabric that are common to the fabric when every other sinker is a reverse plating type of sinker and alternate sinkers are of other types, such as saw-tooth or plain sinkers.

In the hereinafter described mechanism, the leg and foot portions of the sock may be knitted either from a body yarn with or without a facing yarn or with or without a wrap yarn. Also, knitting can be carried on throughout the foot with the backing yarn only, omitting the facing yarn or wrap yarn or both of the same, as desired.

Some of the objects of the invention having been stated, other objects will appear as the description proceeds when taken in connection with the accompanying drawings in which—

Figure 1:
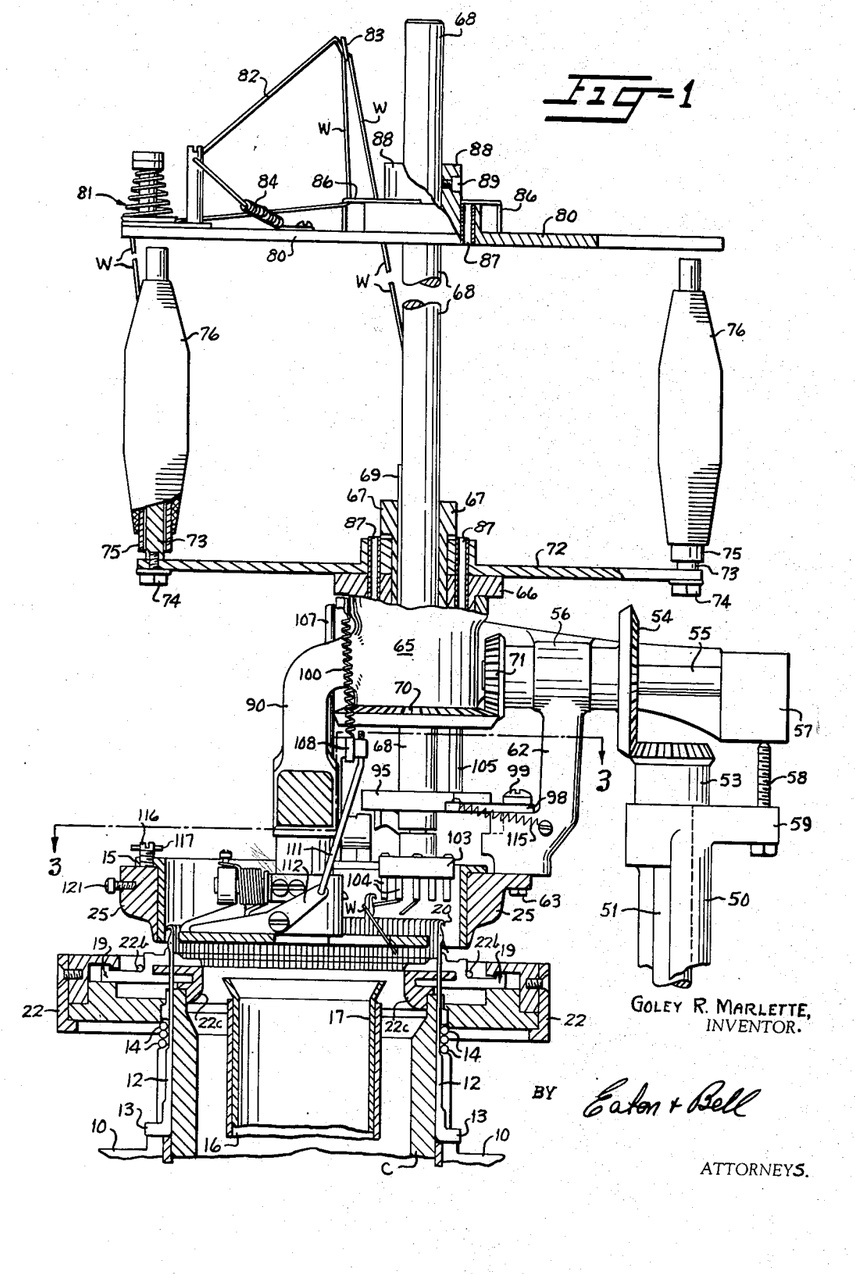
Figure 1 is an elevation of the upper portion of a knitting machine showing it equipped with a wrap mechanism and showing the upper portion of the needle cylinder and associated parts in vertical section and with parts of the wrap mechanism broken away and in section.
Figure 2:
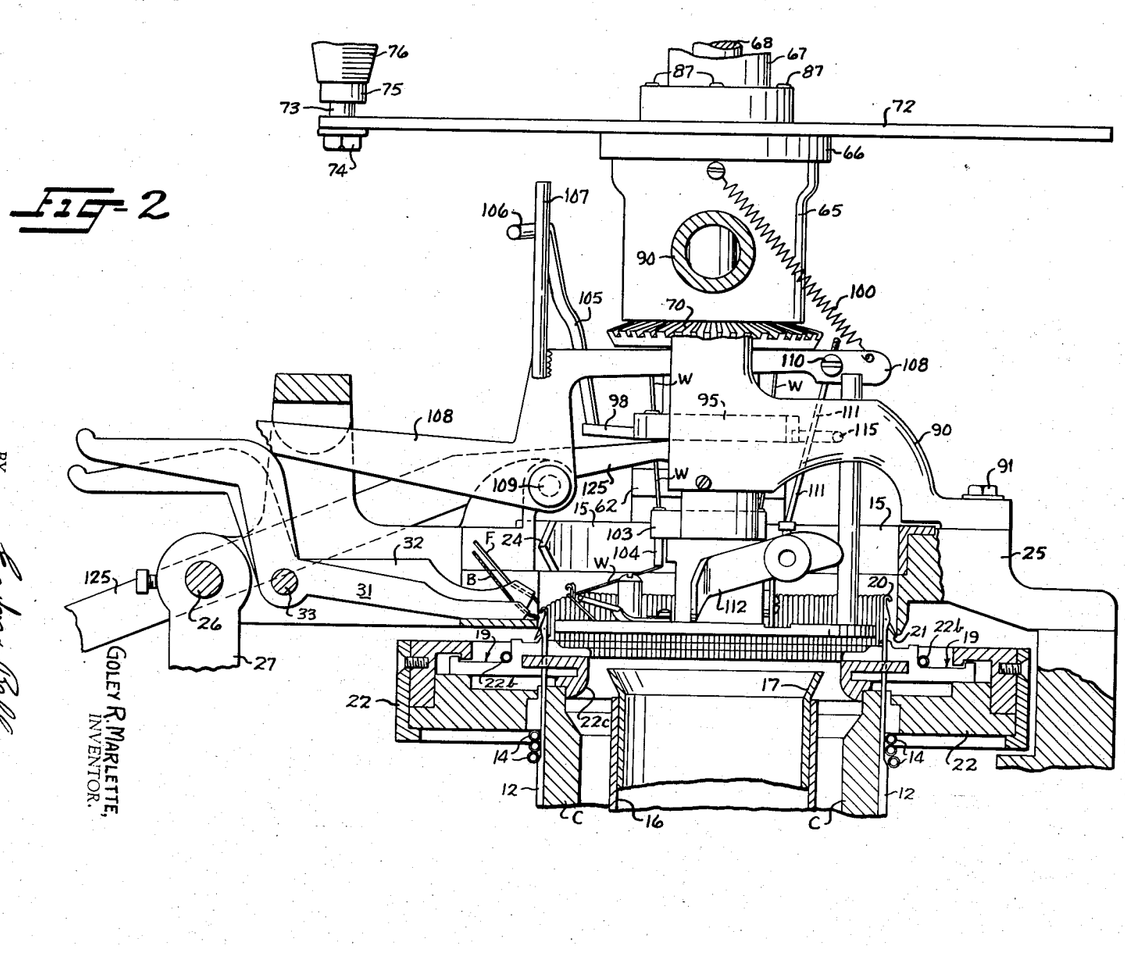
Figure 2 is a vertical sectional view through the upper portion of the needle cylinder and associated parts, showing the wrap mechanism in elevation with parts in section and being taken at right angles from Figure 1 and looking at Figure 1 from the left.
Figures 16, 17:
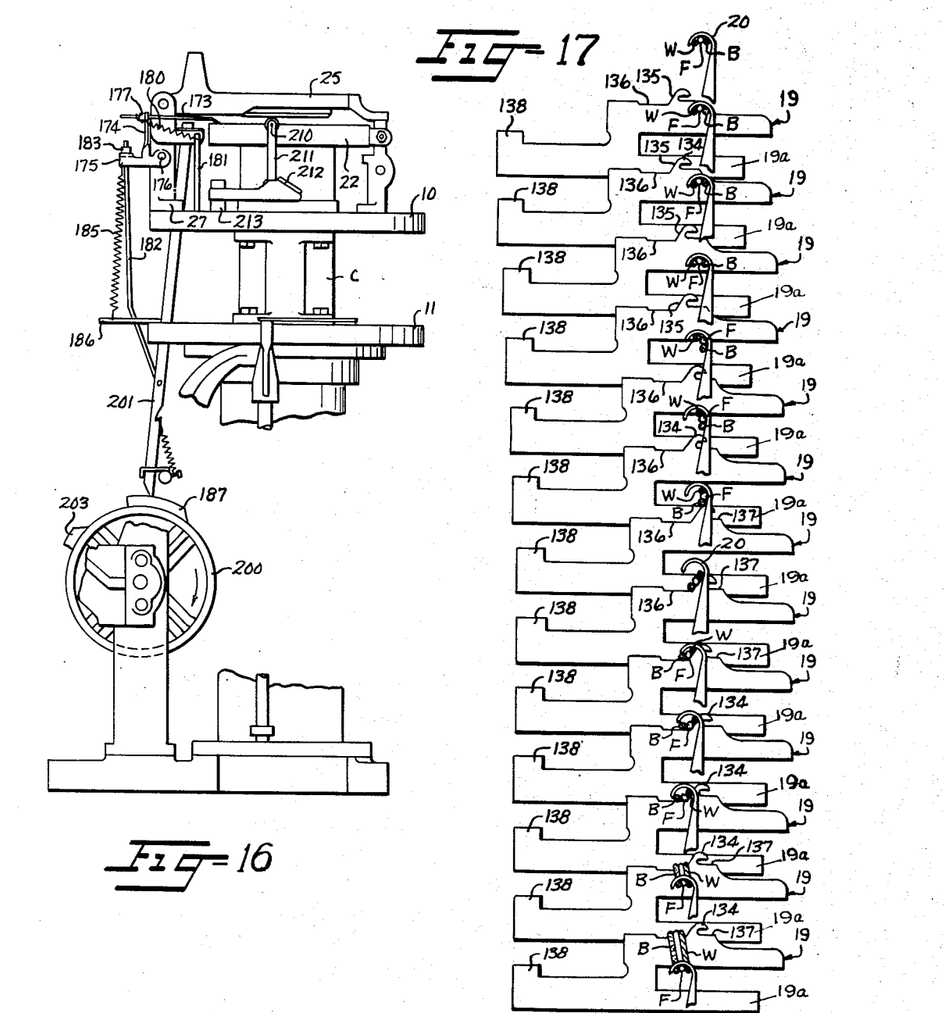
Figure 16 is an elevation showing the control means extending from the main pattern drum to the means for controlling the sinkers.
Figure 17 is a schematic view showing the progressive positions of the sinkers and a needle in the formation of a loop stitch employing a wrap yarn, a facing yarn and a backing yarn.

Referring more specifically to the drawings, the numerals 10 and 11 indicate an upper bed or cam plate and a lower bed plate of a knitting machine in which a needle cylinder C is rotatably mounted (Figures 1, 2 and 16). This cylinder C has a plurality of vertically disposed grooves in which a plurality of needles 12 having butts 13 thereon are mounted for vertical movement. Certain of these have a jack for operating the same so that certain of the needles may be raised to a higher elevation than other needles to take wrap threads, but such mechanism is not shown since it is conventional, as shown in Patent No. 1,906,204 of April 25, 1933. These needles are held in their grooves by one or more conventional endless tension springs 14.

Disposed within the cylinder C is a conventional sleeve 16 having a telescopic portion 17 through which the knitted stocking feeds downwardly during a knitting operation. The knitting machine is equipped with a sinker ring 22 in which a plurality of reverse plating sinkers 19 are mounted for radial movement. These sinkers have upwardly and downwardly sloping shoulders 135 on the rear or outer portions of their nibs 134. The needles are conventional latch needles each having a hook 20 on its upper end and a pivoted latch 21 adapted to be closed on downward movement of the needles through the fabric.

The upper horizontal flange of the sinker cap or ring 22 has a sinker retaining ring 22a depending from its inner edge, inwardly of the butts of the sinkers. The sinkers 19 are normally urged inwardly by an endless tension spring 22b and each sinker 19 has a tail portion 19a which, at times, is urged into engagement with a conventional inside sinker ring 22c carried by the needle cylinder C.

Figure 3:
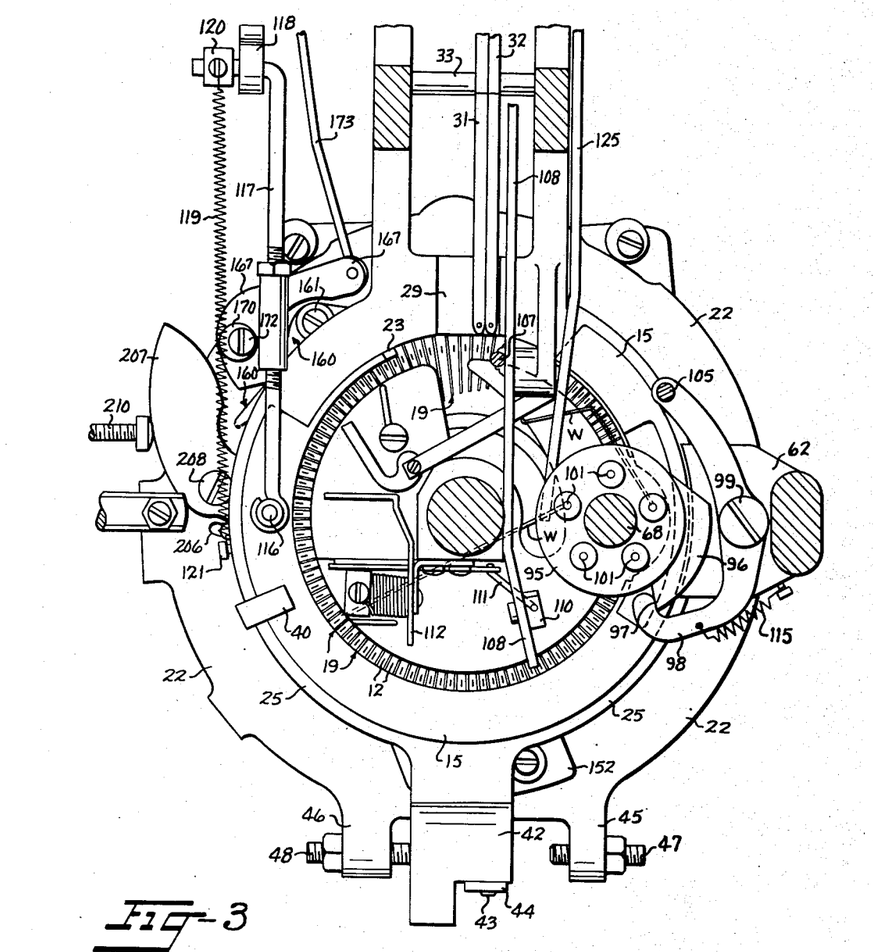
Figure 3 is a horizontal sectional plan view taken substantially along the line 3—3 in Figure 1.
Figure 4:
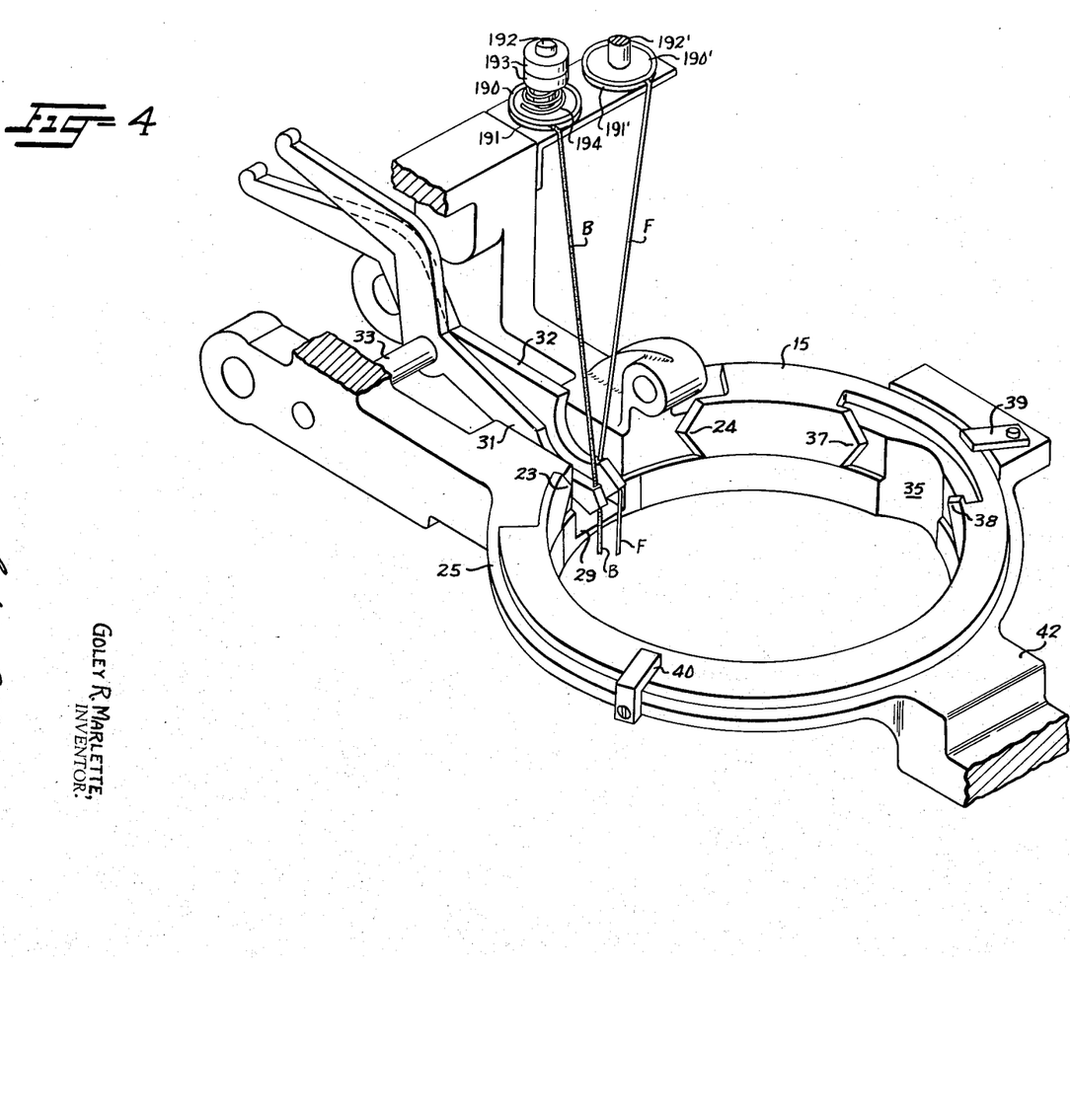
Figure 4 is an isometric view of the latch ring and gap closer assembly, showing the two feed fingers for the backing and facing yarns as employed in this invention.

The knitting machine is also equipped with a latch ring 25 spaced above the sinker cap 22 and pivoted, as at 26, to an uprising conventional post 27. The latch ring 25 oscillatably confines therein a gap closer ring 15 having cam portions 23 and 24 disposed on each side of the throat plate 29. The throat plate 29 and the latch ring 25 have coinciding gaps therein which are conventional and in which the backing yarn finger 31 and facing or plating yarn finger 32 are disposed (Figures 2, 3 and 4). The facing yarn feed finger 32 is positioned against the lead side of the throat plate gap and the backing yarn feed finger 31 has its lead side positioned against the proximate side of the facing yarn feed finger 32, but the feed eye of the facing yarn feed finger 32 is at a higher elevation than the feed eye of the backing yarn feed finger 31.

Figure 15:
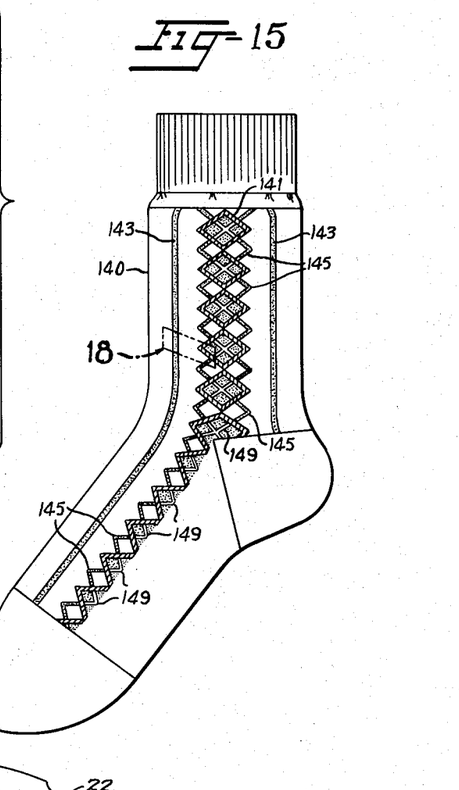
Figure 15 is an illustration of one type of sock which may be manufactured on the herein described machine.
Figure 18:
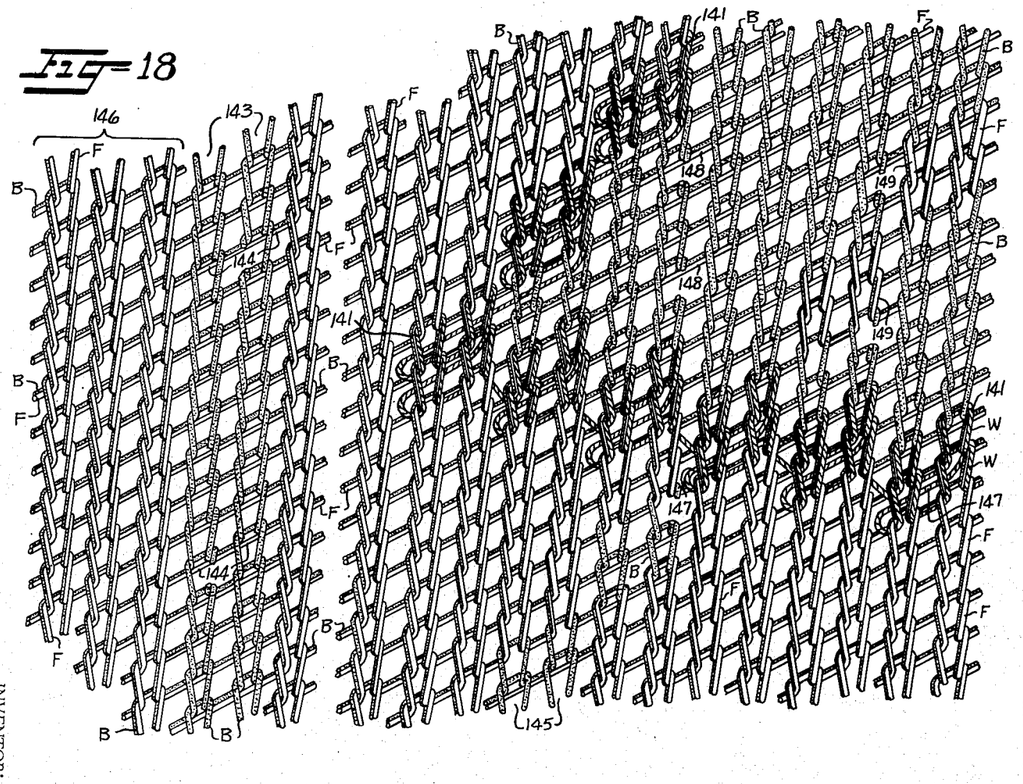
Figure 18 is a greatly enlarged isometric view of the loop structure showing the dotted rectangular area 18 in Figure 15.

This allows partially lowered float needles to pass under the facing yarn to make patterns such as illustrated in Figures 15 and 18 or any other desired pattern or patterns knitted from the backing yarn only. This also causes the backing yarn to be placed lower than the facing yarn on the shanks of the needles, which position is reversed when knitting takes place on the back slopes of the nibs of the reverse plating sinkers 19. These fingers 31 and 32 are pivotally mounted on a pivot 33 disposed between the two side portions of the latch ring which are pivoted, as at 26. These fingers 31 and 32 have their ends next to the needles raised and lowered in a feeding operation by a conventional push rod engaging the outer ends of the same, which is not shown as it is conventional.

The latch ring 25 is cut away, as at 35, for accommodating a wrapping disk or tubes extending therefrom which will be presently described. It is oftentimes not necessary to cut this latch ring away as at 35, but in the event that it is cut away, then it is necessary to cut away the gap closer also, and by cutting away the gap closer, cammed portions 37 and 38 are provided for preventing injury to the latches of the needles and preventing their entering the cavity 35 during reciprocatory knitting.

The gap closer is loosely confined in position by any suitable means such as clips 39 and 40 as is conventional. The latch ring has a projection 42 having a pin 43 therein adapted to engage a spring clip 44 rising up from the bed plate 10 of the machine to clamp the latch ring in position. The sinker ring 22 has projections 45 and 46 with set screws 47 and 48 therein for regulating the position of the sinker ring as desired.

The backing yarn is indicated by reference character B, the facing yarn is indicated by reference character F and the warp yarn is indicated at W. It is to be noted that the backing yarn B is fed through a hole or passageway present in the free end of the finger 31 at a lower level than the facing yarn F, which is unconventional.

The machine has rising upwardly therefrom a bracket 50 which has disposed inside thereof a rotary shaft 51 (Figure 1) which has on its lower end a beveled gear, not shown, which meshes with a beveled gear, not shown, on a horizontally disposed shaft, which also has another beveled gear thereon which meshes, in turn, with a large beveled gear secured on the cylinder for imparting rotation thereto, such as shown in the patent to Dickens No. 2,278,869. This mechanism heretofore has been employed in some types of machines for driving the dial when the machine was equipped with a dial and dial needles.

On the upper end of shaft 51 is secured a beveled gear 53 which meshes with a beveled gear 54 fixed on a shaft 55 rotatably mounted in a bracket 56. This bracket 56 has a block portion 57 which can be adjusted in position by means of a set screw 58 secured in an outwardly projecting portion 59 of bracket 50. The bracket 56 has integral therewith a downwardly projecting leg 62 which is secured to the latch ring 25 at its lower end, by any suitable means such as a screw 63.

The bracket 56 also has integral therewith a hub portion 65 in which is rotatably mounted a bearing member or portion 66 having fitted therein a bearing 67 which has keyed therein, for vertical sliding movement, a wrap shaft 68. This keyed arrangement is shown as at 69. The bearing portion 66 has integral therewith a beveled gear 70 which meshes with a beveled gear 71 on the end of shaft 55.

Mounted on top of bearing portion 66 is a table 72 which has a plurality of cop holders 73 secured thereon by any suitable means such as screws 74, and each cop holder is adapted to receive a cop tube 75 having warp yarn 76 wound thereon, the strands of warp yarn emanating from these cops being indicated at W. In the drawings only two cops of warp yarn 76 are shown as being used, but as many as may be desired may be employed.

The shaft 68 also has secured thereon a disk 80 and for each wrap yarn strand there is a conventional tension mechanism 81 and a tension takeup lever 82 having a hook 83 in its upper end and tensioned by a tension spring 84. The wrap yarn passes through a suitable ring 86 before it moves downwardly through suitable tubes 87 in a hub portion 88 of circular disk 80, which hub portion is secured to the shaft 68 by any suitable means such as a screw 89. The bearing member or portion 66 also has a plurality of these tubes 87 through which the wrap yarns pass.

Projecting from the hub portion 65 is a downwardly projecting arm 90 which is secured, as at 91 (Figure 2), to the latch ring 25 to thus properly support the wrap stripe mechanism. Disposed below and fixed on the wrap shaft 68 is the gear 70. Also, fixed on the wrap shaft 68 is a disk member 95 having a cam portion 96 thereon (Figures 1 and 3) which is adapted to engage the end 97 of a lever 98 pivoted, as at 99, on portion 62. The disk 95 has a plurality of vertically disposed holes 101 through which the wrap threads pass on their way to the needles. The lower end of the wrap shaft 68 has fixed thereon a wrap disk 103 having a plurality of vertically disposed tubes 104 penetrating the same, and projecting downwardly into close proximity to the needed circle, but being normally disposed above the upper ends of the normally raised needles but below the needles raised to take the wrap yarns.

The lever 98 has rising upwardly therefrom a rod 105 which has an outturned portion 106 on its upper end (Figure 2) adapted to engage a lever 107 welded to a lever 108 pivoted, as at 109, and which is operated by oscillation of the lever 98 by engagement with cam 96. This lever 108 has pivotally connected thereto, as at 110, a link 111 which projects downwardly and is secured to one end of a conventional clamp and cutter assembly 112 so that, when the wrap disk 103 is in lowermost position, it will operate the clamp and cutter mechanism for cutting the double sole thread, when used, upon each revolution of the needle cylinder, since the wrap shaft 68 and the needle cylinder are moved in timed relation to each other, namely, at a one-to-one ratio as fully disclosed in said Dickens patent No. 2,278,869.

This clamp and cutter can also be employed for clipping the facing yarn in the event a plurality of courses are floated at a time. The lever 98 is biased by a spring 115 to prevent its passing beneath disk 95 when it is lowered to wrap position.

The gap closer 15 has pivotally connected thereto, as at 116 (Figure 3), a link 117 which is connected to a lever 118 controlled by the pattern drum for oscillating the latch ring and moving the same to gap closing position to close the throat plate gap during reciprocatory knitting, which is conventional. This is normally biased to circular knitting position by means of a tension spring 119 secured to a block 120 on the outturned portion of link 117 and secured to a spring anchor 121 mounted on the latch ring.

The lever 108 is biased to cause it to move in a counterclockwise direction in Figure 2 by means of a tension spring 100. During reciprocatory knitting, such as during heel and toe knitting, the wrap shaft 68 and associated parts are raised upwardly by means of a lever 125 having one end disposed below the disk 95 and pivoted, as at 26, and which is moved by a conventional push rod operated by the main pattern drum of the machine.

It is to be observed that all of the sinkers 19 are reverse plating type of sinkers and each has a nib 134 forming an outwardly and downwardly sloping surface 135, as heretofore described, and also has a conventional butt 138. These butts can be either long, short or medium butts, but all sinkers may have the same length of butts. The reverse plating type of sinkers also have backs or bases 136 and platform portions 137 disposed outwardly and inwardly, respectively, of the nibs 134. The butts of all of the sinkers are engaged by suitable means to be presently described to advance all of the sinkers to engage the loops and hold them during the knitting operation.

Figures 5, 6:
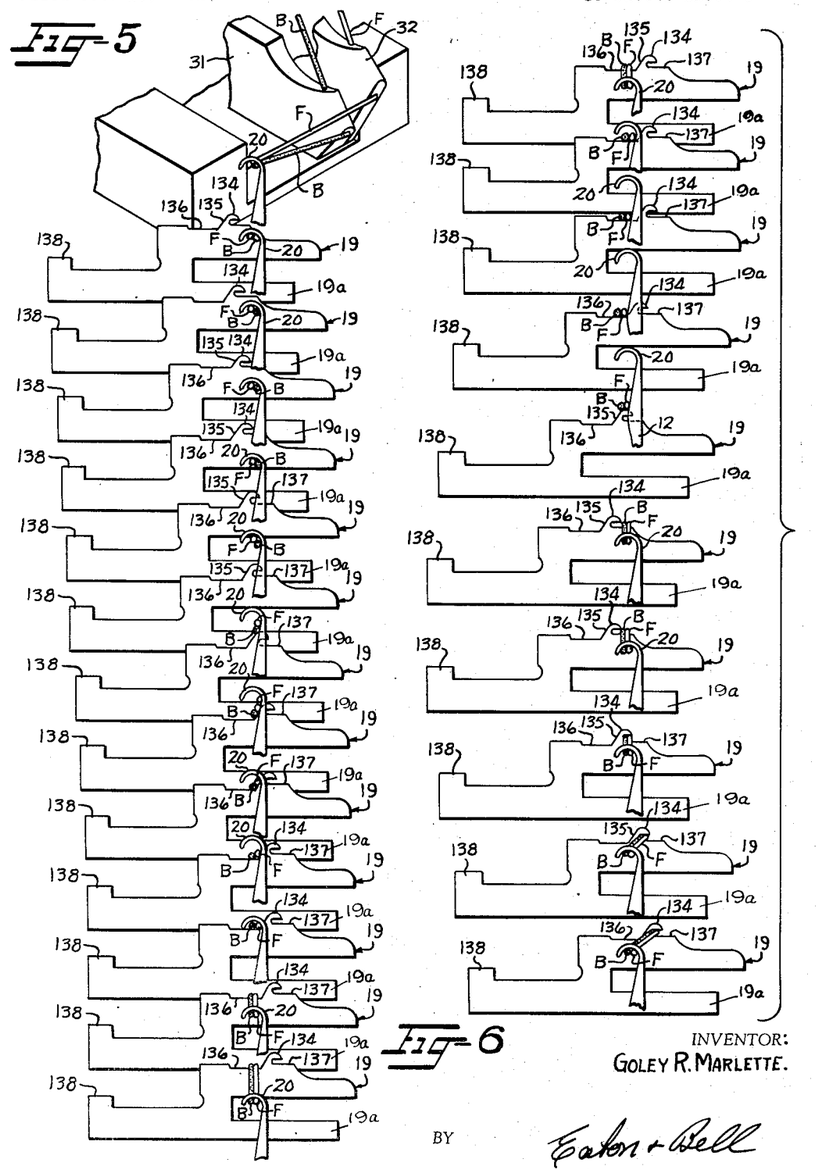
Figures 5 and 6 are developed partially isometric views showing the action of a particular needle from the point of taking the yarn until the needles have reached the point where they have fully lowered the knitted loops to a point where they are engaged by the nibs of the sinkers when they have moved inwardly.

By referring to Figure 5, it is seen that the backing yarn B, which is fed under greater tension than the facing yarn F, remains in substantially the same position with the facing yarn F reading from top to bottom for movement of the cylinder equivalent to the space of approximateily a dozen needles around the needle circle. It will be noted in Figure 5 that the sinkers are gradually advanced inwardly from the top to the bottom of Figure 5 as the needles and sinkers approach the knitting wave.

About the seventh sinker from the top in Figure 5, it will be noted that this sinker has been advanced inwardly to a reverse plating position before the yarns are brought against the outwardly sloping shoulder 135. The needles are bringing the two yarns B and F down onto the sinkers when they reach this point. In Figures 5 and 6, it is shown how the backing yarn and the facing yarn are progressively slid down the sloping surfaces 135 of the nibs 134 of the sinkers 19 to cause the backing yarn to remain on the inside of the fabric and the facing yarn, under lesser tension, will stand out on the outside of the fabric. Since the facing yarn F is under lesser tension than the backing yarn B, this will prevent its being buried in the backing yarn and flattening the backing yarn to allow its edges to show and thus blur or mar the effect of patterning during a plating operation.

The description given with reference to Figures 5 and 6 is equally applicable to Figure 17 in which a wrap thread W is also employed. This wrap thread W is also under lesser tension than the facing yarn which is, in turn, under lesser tension than the backing yarn and, being deposited on the outside of the facing yarn, it is there seen in step-by-step relation how the needles roll these three yarns down the sloping surfaces 135 and, the backing yarn B being fed at a lower point than the facing yarn F the wrap yarn W will begin to assume the lowermost position as the needle is lowered at about the seventh sinker from the top in Figure 17.

On subsequent steps, like at the eighth sinker 19 from the top in Figure 17, the needles will have been further lowered to slide the yarns down the sloping surfaces 135 and they will finally assume a flat position on the top of the sinkers at the base 136 of the sloping surfaces 135 as at the twelfth sinker 19 from the top in Figure 17. There it is clear that the backing yarn B will be on the inside of the fabric, the facing yarn F will be deposited on the top of the backing yarn and the wrap yarn W will be deposited on top of the facing yarn or on the outside surface of the fabric. The last two yarns F and W, being under lesser tension than the backing yarn B, will cause these to stand out more fully and not bury themselves in the backing yarn. Thus, a more clear cut effect of the wrap stripe will be produced in the same manner as a more clear cut effect of patterning by the facing yarn will be produced in Figures 5 and 6.

A sock 140 is illustrated in Figure 15 wherein a wrap stripe effect 141 is shown, preferably produced on each side of the sock. Of course, by varying the needles which take the wrap yarn or yarns, it is possible to produce as many different patterns as desired. This is caused by raising, progressively, needles in different wales from course to course in diverging relation until the full width of a diamond is formed and the wrap stripes will be knitted as previously explained in the fabric, the wrap yarn being floated in back of the stitches formed therefrom from course to course as at 147. Groups of needles between the raised needles which take the wrap yarn to form stripes 141 will be raised later in each course to take the backing yarn only and the facing yarn will be floated across the intervening needles of the diamond portion as indicated at 148. This diamond effect of the wrap stripe is shown in Figures 15 and 18.

The lines 143 in Figure 15 represent vertically disposed wales in which the facing yarn F is also floated behind the needles as at 144 in Figure 18, allowing the backing yarn B only to be knitted to produce the stripes 143. Short stripes 145 between adjacent diamonds are also formed in the manner last described. This is effected in a conventional manner by lowering the needles at stripes 143 and 145 in advance of the facing yarn feed finger 32 so they take the yarn B from finger 31 only to cause the facing yarn to float on the back of the needles as at 144 when they are lowered in the knitting wave.

Figure 13:
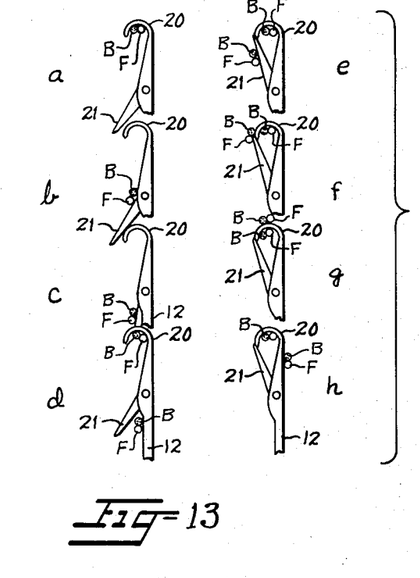
Figure 13 is a view showing progressively the shedding and casting off of the loops by the needles.

In Figure 18 the normally plated wales are indicated at 146. Diagonal stripes 149 within the diamonds are also formed by plating the facing yarn over the backing yarn. Figures 5 and 6 show the manner of forming the loops and show the plating relation of the backing and facing yarns and Figure 17 also shows the relation of the wrap yarn W to the yarns B and F while the loops are being formed. In Figure 13 action of shedding the loops from the latches and thereafter casting off the loops is shown successively and shows the position of the backing and facing yarns after a casting off operation has been completed.

There are several steps shown in Figure 13, step *a* representing the position of the needles in their fully lowered position ready to be raised. In step *b* the needle has started its rising movement, and in step *c* it has practically completed its upward movement and is ready to receive the new strands of yarn. In step *d* the needle has again started its downward movement and the prior loops are shed from the latch 21. In step *e* the yarns are riding up over the latch in a casting off operation as the needles are lowered, in step *f* the needles are lowered somewhat more, and in step *g* the loops are being passed off over the tops of the needles. In step *h* the needle is moving upwardly and completely casting off the loops whereupon the operation of the needle is repeated to form a new course in knitting. It is thus seen how the yarns are placed by the sinkers in Figures 5 and 6 and how this relation is maintained until the loops formed have been cast off of the needles.

The backing and facing yarns, B and F respectively, must have means for regulating the tension and, as is herein described, the backing yarn is run under greater tension than the facing yarn. Suitable tension disks 190 and 191 (Figure 4) are provided on a suitable pin 192 having nuts 193 thereon for applying the proper compression to a compression spring 194 disposed around the pin 192 for applying the proper tension to the backing yarn B. The other tension means for the facing yarn F is identical to that described with the top portion omitted and like reference characters will apply with the prime notation added.

The parts heretofore described, are substantially conventional and substantially the same as shown in my prior Patent No. 2,528,067, with the exception that all of the sinkers are of the reverse plating type instead of alternate sinkers being the saw tooth or plain type. Now, in order to control the sinkers when all of the sinkers are of the reverse plating type, novel means are provided for controlling the sinkers 19 which generally includes a central sinker cam 150, a sinker throw-out cam 151 and a sinker guard cam or clearing cam 152.

Since the sinkers 19 are always normally urged inwardly, to act as web holders, by the spring or sinker band 22*b* and so the tails 19*a* thereof normally engage the inside sinker ring 22*c*, the central sinker cam 150 functions to move the sinkers outwardly during normal knitting; that is, when the yarns are not being controlled as to plating relationship or if only a single yarn is being knitted. The central sinker cam 150 then occupies the position shown in Figure 8; usually during knitting of the top, heel and toe of a stocking or sock.

It will be noted that the sinker retaining ring 22*a*, which is integral with the sinker cap 22, is cut away to provide an opening therebetween in which the central sinker cam 150 is disposed. The central sinker cam 150 is pivotally connected, as at 154, to the lower surface of the inwardly projecting flange of the sinker cap 22 and the free end of the central sinker cam 150 has a pin or screw 155 projecting upwardly therefrom which works in a slot 156 in the sinker cap 22. It will be observed in Figure 9 that the central sinker cam 150 may ride upon the outer portions of the sinkers inwardly of the butts 138 and, regardless of whether the central sinker cam 150 is in either of the positions shown in Figures 7 and 8, the butts 138 of the sinkers 19 are caused to ride against the outer edge of the central sinker cam 150 due to the spring 22*b*.

Figure 7:
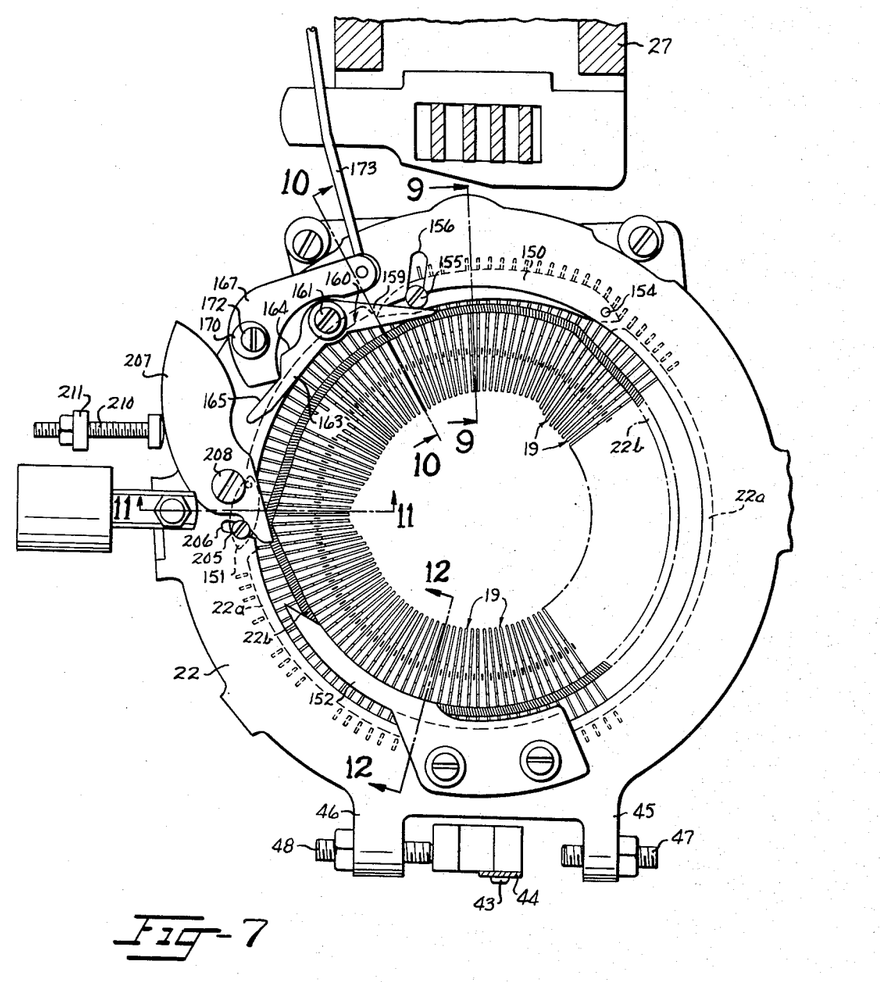
Figure 7 is a plan view taken at a point between the top of the sinker cap and the lower surface of the horizontal flange of the latch ring with the latch ring being omitted.
Figures 8, 9, 10, 11, 12:
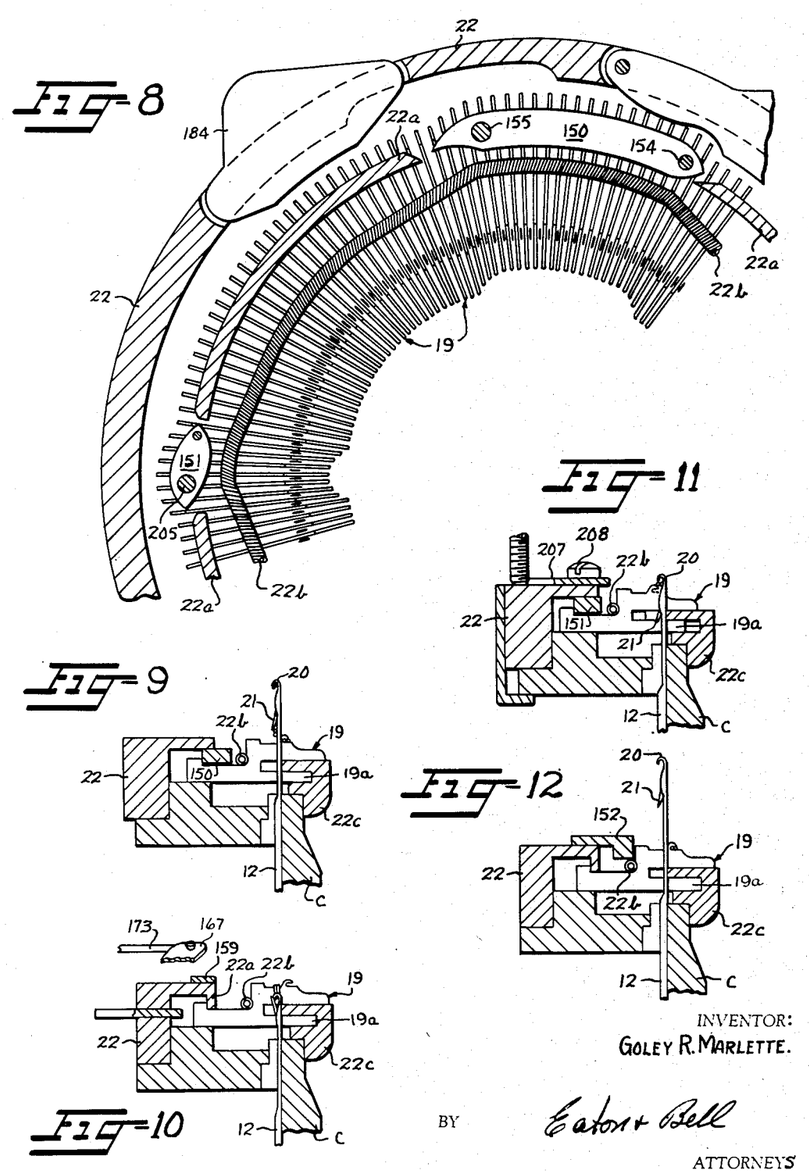
Figure 8 is a sectional plan view of the upper and left-hand portion of Figure 7, taken at a point below the top of the sinker cap and showing the improved sinker cam arrangement.
Figure 9 is a vertical sectional view taken substantially along the line 9—9 in Figure 7 at the yarn feeding point.
Figure 10 is a vertical sectional view taken substantially along the line 10—10 in Figure 7 at the knitting point.
Figure 11 is a vertical sectional view taken substantially along the line 11—11 in Figure 7 at the point at which the sinkers are retracted to position the yarn inwardly of the nibs.
Figure 12 is a vertical sectional view taken substantially along the line 12—12 in Figure 7 showing the loop shed from the latch but retained on the shank of the needle.

The central sinker cam 150 is shown in non-plating position in Figure 8 and is shown in plating position in Figure 7. In order to control the position of the central sinker cam 150, the pin 155 is urged into engagement with an arm 159 of a sinker control finger 160, by means of the spring 22*b* engaging the sinkers 19. The sinker control finger 160 is best shown in Figure 7 and is oscillatably mounted intermediate its ends, as at 161, on the upper surface of the sinker cap 22. The sinker control finger 160 also has an arm 163 provided with stepped surfaces 164 and 165 thereon.

The surfaces 164 and 165 are alternately engaged by the inner end of a sinker finger operating lever 167 which is oscillatably mounted on an eccentric collar 170 adjustably secured to the upper surface of the sinker cap 22 by any suitable means such as a screw 172. The finger operating lever has the front end of a link 173 pivotally connected thereto which extends rearwardly and, as shown in Figure 16, slidably penetrates an arm 174 of an inverted substantially T-shaped bell crank 175. The bell crank 175 is pivotally mounted, as at 176, on one side of the conventional latch ring post 27. The link 173 has a collar 177 adjustably secured thereon which is normally urged into engagement with the outer surface of the arm 174 of bell crank 175 by a tension spring 180. One end of the tension spring 180 is connected to the outer end of the link 173 and the other end thereof is connected to a suitable spring anchor 181 extending upwardly from the upper bed plate 10.

The bell crank 175 is slidably penetrated by a connecting rod or link 182 having a collar 183 adjustably secured on the upper end thereof which is normally urged into engagement with the upper surface of the bell crank 175 by a tension spring 185. The upper end of the tension spring 185 is connected to a suitable screw in collar 183 and the lower end thereof is connected to a suitable spring anchor 186 extending outwardly from the lower bed plate 11 of the knitting machine.

It might be stated that the tension spring 185 is substantially stronger than the tension spring 180 in order that it may overcome the same when the cam 187 on the main pattern drum 200 moves out of engagement with the lower end of the thrust rod 201 to which the lower end of the connecting rod or link 182 is pivotally connected. The main pattern drum 200 also has a cam 203 fixed thereon and spaced from the cam 187.

During normal non-plating knitting, the cam 150 occupies the position shown in Figure 8 and all of the sinkers 19, after passing the cam 150, successively engage the inner surface of the conventional cam 184 which then advances them fully inwardly, since the fabric and the rise of the needles has a tendency to force the sinkers 19 outwardly, and to thus hold the yarn or yarns beneath their nibs so that the needles, in rising up through the loops, will not carry the loops or fabric along with them and, thus, will make possible the shedding of the loops from the latches 21 of the needles 20.

Figure 14:
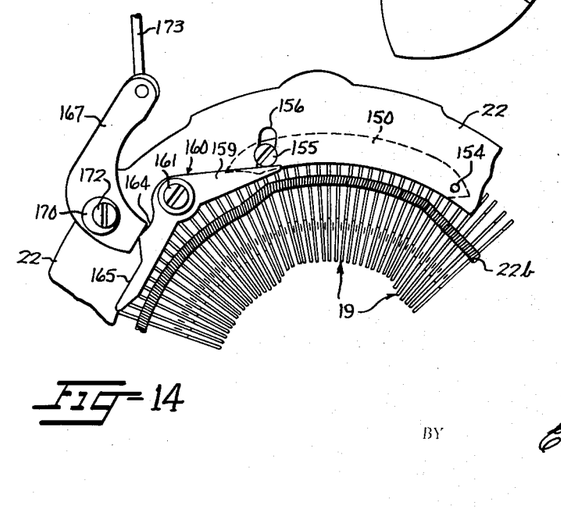
Figure 14 is a somewhat schematic view similar to the upper portion of Figure 7, showing the parts in a different position.

During the knitting of the leg and foot of the stocking, the cams 187 and 203 successively move into engagement with and elevate the thrust rod 201 and this causes the link 173 to move forwardly, or downwardly in Figure 14, to move the finger operating lever 167 in a clockwise direction to the position shown in Figure 7. This permits the sinker control finger 169 to move in a clockwise direction from the position shown in Figure 14 to that shown in Figure 7, with the result that the central sinker cam 150 is moved inwardly from the position shown in Figure 8 to that shown in Figure 7 by the spring 22b pressing against the sinkers 19.

Thus, the sinkers commence moving inwardly at the right-hand end of the central sinker cam 150 and reach their fully inward position, with the tails 19a thereof against the inside sinker ring 22c, at substantially the line 9—9 in Figure 7 and as shown in Figure 9. This causes the sinkerse 19 to move inwardly from the position in which the uppermost sinker is shown in Figure 5 to the position occupied by the thirteenth sinker from the top in Figure 5 and substantially as shown in Figure 10. The sinkers 19 then engage the outer surface of the sinker throw-out cam 151 and are again moved outwardly, through the position shown in Figure 11, substantially to the position occupied by the sixth sinker from the top in Figure 6 to thus cause the loops to ride over the nibs 134 of the sinkers and to rest upon the platforms 137 thereof.

The needles then continue downwardly, as heretofore described, to the position shown at the lowermost sinker shown in Figure 6, after which the sinkers are all moved inwardly by the guard cam 152. As the needles move adjacent the guard cam 152, they are elevated to their highest position (Figure 12) and continue in this elevated position until they reach the central sinker cam 150, except for those needles which may be elevated prior to this time to take the wrap yarn or are lowered to a floating position in which they miss the yarn F from finger 32.

In order to control the sinker throw-out cam 151, the cam 151 has a pin 205 projecting upwardly therefrom which works in a slot 206 formed in the sinker cap 22 (Figure 7). The inner surface of the cam 205 is engaged by a control finger 207 pivotally mounted, as at 208, on the sinker cap 22. The outer surface of the control finger 207 is engaged by a headed pin or adjustment screw 210 adjustably mounted in the upper end of a rigid arm 211 which extends downwardly and is fixed to a conventional needle lowering or draw down cam 212 (Figure 16) pivoted on a post 213 and which is controlled, as to radial movement relative to the needle cylinder C, by conventional pattern means of the knitting machine, not shown.

It is thus seen that by providing substantially identical sinkers, of the reverse plating type, cooperating with all of the needles, means for effecting greater tension in the backing yarn than in the facing and/or wrap yarn, and a unique means to control radial movement of the sinkers relative to vertical reciprocation of the needles, one or more facing yarns and/or one or more wrap yarns may be knitted in plating relation to a backing yarn or yarns to produce any desired pattern and wherein a perfect coverage or an accurate alinement of one or more plating and/or wrap yarns on top or over the backing yarn is obtained. Accordingly, all areas knitted from one color yarn plated over another color yarn have a solid color appearance heretofore unobtainable and are substantially free of streaks as are usually caused by the backing yarn "bleeding" through the area knitted from the facing and/or wrap yarn.

Also, since all of the sinkers are successively controlled in the identical manner, in knitting each course, the finished fabric is devoid of so-called sinker print lines between adjacent wales.

In the drawings and specification there has been set forth a preferred embodiment of the invention and although specific terms are employed, they are used in a descriptive and generic sense only, and not for purposes of limitation, the scope of the invention being defined in the claims.

I claim:

1. In a circular knitting machine having a throat gap and also having a plurality of vertically movable needles and also having a plurality of sinkers and all of said sinkers being substanitally identical and each having a nib thereon, the combination of means for moving the sinkers inwardly to cause the yarns to be deposited onto and outwardly of the nibs thereof, means for feeding a facing yarn to the needles under relatively light tension and at a high elevation relative to the bottom of the throat gap, means in the throat gap for feeding a backing yarn to the needles under relatively high tension and at a lower level than the point of feeding the facing yarn and at a point on the trailing side of the first feeding means whereby during knitting, the facing yarn will slide downwardly on the shoulders of the sinkers following the backing yarn which is under higher tension, means for moving said sinkers outwardly subsequent to the knitting wave to cause the yarns to be positioned inwardly of the nibs of the sinkers and means operable thereafter for moving the sinkers inwardly to hold the yarns under the nibs thereof to thereby permit the needles to be subsequently raised relative to the yarns.

2. In a circular knitting machine having a needle cylinder provided with a plurality of vertically reciprocable latch needles and having a plurality of sinkers, and means for successively feeding a wrap yarn, a facing yarn and a backing yarn to selected needles at progressively lower elevations and at progressively lesser tensions; the combination of means for advancing each successive sinker inwardly as each corresponding needle is lowered during the knitting wave to cause the yarns to be slid down the shoulders of the sinkers to cause the facing yarn and the wrap yarn, even though under progressively less tension, to appear on the exterior of the fabric and next to the shoulders of the sinkers, means for withdrawing each successive sinker outwardly to move the nib thereon past the yarns at the end of the knitting wave to cause the yarns to be deposited in front of the nibs of the sinkers as the needles are raised and means for again advancing each successive sinker as the needles are again lowered to cause the yarns to be held by the nibs of the sinkers whereby, upon subsequent raising of the needles, the latches thereof will move upwardly past the yarns.

3. In a circular knitting machine having means to feed at least two yarns at different elevations and at different tensions in plating relation at a point in advance of the beginning of the knitting wave and said machine also having a plurality of adjacent sinkers each provided with a nib thereon forming a downwardly and outwardly sloping shoulder; the combination of means for advancing the sinkers inwardly during the knitting wave to cause the portions of the two yarns previously fed to a needle adjacent each sinker to be slid downwardly and outwardly upon the shoulders of the sinkers and to cause the yarn having the lesser tension therein to be positioned between the other of the two yarns and the nibs of the sinkers, means for withdrawing the sinkers outwardly to cause the yarns to ride over and be deposited in front of the nibs of the sinkers, and means operable upon the sinkers after said sinkers have been withdrawn to again move the sinkers inwardly to cause the yarns to be held by the nibs.

4. In a circular knitting machine having means to successively feed at least two yarns in plating relation at a point in advance of the beginning of the knitting wave and wherein a first of the yarns is fed on a higher level and under a lesser tension than a succeeding yarn, said machine also having a plurality of adjacent sinkers each provided with a nib thereon forming a downwardly and outwardly sloping shoulder; the combination of means for advancing each successive sinker inwardly during the knitting wave to cause the portions of the two yarns previously fed to a needle adjacent each sinker to be slid downwardly and outwardly upon the shoulders of the sinkers and to cause the yarn having the lesser tension therein to be positioned between the other of the two yarns and the nibs of the sinkers, means for thereafter withdrawing the sinkers outwardly to cause the yarns to ride over and be deposited in front of the nibs and means operable upon the sinkers after said sinkers have been withdrawn to again move the sinkers inwardly to cause the yarns to be held by the nibs.

5. In a circular knitting machine having means to successively feed at least two yarns in plating relation at a point in advance of the beginning of the knitting wave and wherein a first of the yarns is fed on a higher level and under a lesser tension than a succeeding yarn, said machine also having a plurality of adjacent sinkers each provided with a nib thereon forming a downwardly and outwardly sloping shoulder; the combination of means for advancing each successive sinker inwardly during the knitting wave to cause the portions of the two yarns previously fed to a needle adjacent each sinker to be slid downwardly and outwardly upon the shoulders of the sinkers and to cause the yarn having the lesser tension therein to be positioned between the other of the two yarns and the nibs of the sinkers, means for thereafter withdrawing the sinkers outwardly to cause the yarns to ride over and be deposited in front of the nibs, means operable upon the sinkers after said sinkers have been withdrawn to again move the sinkers inwardly to cause the yarns to be held by the nibs, and means for floating the facing yarn past certain needles to cause only the backing yarn to be knitted by said certain needles.

6. In a circular knitting machine having means to successively feed at least two yarns in plating relation at a point in advance of the beginning of the knitting wave and wherein a first of the yarns is fed on a higher level and under a lesser tension than a succeeding yarn, said machine also having a plurality of adjacent sinkers each provided with a nib thereon forming a downwardly and outwardly sloping shoulder; the combination of means for advancing each successive sinker inwardly during the knitting wave to cause the portions of the two yarns previously fed to a needle adjacent each sinker to be slid downwardly and outwardly upon the shoulders of the sinkers and to cause the yarn having the lesser tension therein to be positioned between the other of the two yarns and the nibs of the sinkers, means for thereafter withdrawing the sinkers outwardly to cause the yarns to ride over and be deposited in front of the nibs, means operable upon the sinkers after said sinkers have been withdrawn to again move the sinkers inwardly to cause the yarns to be held by the nibs, and means for presenting wrap thread to selected needles in addition to the two first mentioned yarns and at a lesser tension than is present in either of the first two mentioned yarns so that the wrap thread will be present on the exterior of the fabric to cover the other two yarns at those needles where wrap thread is knitted.

7. In a knitting machine having a cylinder provided with a plurality of vertically reciprocable latch needles and also having a throat gap, first means in the throat gap for feeding a facing yarn to the needles under relatively light tension, second means in the throat gap for feeding a backing yarn to the needles under relatively high tension and at a lower elevation than the point of feeding the facing yarn, the point of feeding of the facing yarn being in advance of the point at which the backing yarn is fed; the combination of a reverse plating sinker cooperating with each of said needles, the reverse plating sinkers each having an upwardly projecting nib forming an outwardly and downwardly sloping shoulder portion thereon, means for advancing the reverse plating sinkers inwardly as the needles are lowered in drawing stitches during the knitting wave to cause the backing yarn and the facing yarn to slide downwardly and outwardly against said shoulder portions, means for withdrawing the sinkers as the needles are raised at the end of the knitting wave to cause the nibs of the sinkers to move outwardly of the two yarns, means thereafter for again advancing the sinkers inwardly as the needles are again lowered to cause the yarns to engage and be held by the sinkers whereby the facing yarn appears on the outside of the fabric to cover the backing yarn and whereby the nibs serve as web holders as the needles subsequently are raised for again receiving the yarn from said first and second means.

8. In a knitting machine having a needle cylinder provided with a plurality of vertically movable needles, a sinker cooperating with each of said needles and each of said sinkers having a nib projecting upwardly from a medial portion thereof and provided with a downwardly and outwardly sloping surface on the outer edge thereof, said nibs defining a platform disposed inwardly thereof on each sinker and a base disposed outwardly of each nib, means for feeding a facing yarn to the needles at a given level and under relatively light tension, and means for feeding a backing yarn to the needles at a slightly lower level than the feeding point of the facing yarn and at a point subsequent to the point at which the facing yarn is fed and also at a high tension relative to the tension present in the facing yarn; the combination of means for moving each successive sinker outwardly from its normal inward position in advance of the knitting wave, means for advancing each successive sinker inwardly to cause the yarns to slide downwardly and outwardly onto said base as the needles are lowered during the knitting wave, means for again withdrawing each successive sinker as the needles are raised following the knitting wave to cause the yarns to pass over the nibs of the sinkers and to be deposited upon said platforms as the needles again move downwardly, and means for again advancing the sinkers inwardly to cause the fabric to be held by the nibs of the sinkers upon subsequent upward movement of the needles to thereby permit the latches of the needles to pass upwardly through the yarns held by the sinkers.

9. In a knitting machine having a needle cylinder provided with a plurality of vertically movable needles, a sinker cooperating with each of said needles and each of said sinkers having a nib projecting upwardly from a medial portion thereof and provided with a downwardly and outwardly sloping surface on the outer edge thereof, said nibs defining a platform disposed inwardly thereof on each sinker and a base disposed outwardly of each nib on each sinker, means for feeding a facing yarn to the needles at a given level and under relatively light tension, means for feeding a backing yarn to the needles at a slightly lower level than the feeding point of the facing yarn, and at a point subsequent to the point at which the facing yarn is fed and also at a high tension relative to the tension present in the facing yarn, means for feeding at least one wrap yarn to selected needles at a higher level than the feeding point of the facing yarn and at a point in advance of the point at which the facing yarn is fed and under a lesser tension than that of the facing yarn and the backing yarn; the combination of means for moving each successive sinker outwardly from its normal inward position in advance of the knitting wave, means for advancing each successive sinker inwardly to cause the yarns to slide downwardly and outwardly onto said base as the needles are lowered in the knitting wave, means for again withdrawing each successive sinker as the needles are raised following the knitting wave to cause the yarns to pass over the nibs of the sinkers and to be deposited upon said platforms as the needles again move downwardly, and means for again advancing the sinkers inwardly to cause the fabric to be held by the nibs of the sinkers upon subsequent upward movement of the needles to thereby permit the latches of the needles to pass upwardly through the fabric held by the sinkers.

10. In a knitting machine having a cylinder provided with a plurality of vertically reciprocable needles, first means for feeding a facing yarn to the needles under relatively light tension, second means for feeding a backing yarn to the needles under relatively high tension at a lower elevation than the point of feeding the facing yarn, the point of feeding of the facing yarn being in advance of the point at which the backing yarn is fed; the combination of a reverse plating sinker cooperating with each of said needles, each sinker having an upwardly projecting nib thereon forming an outwardly and downwardly sloping shoulder portion, means for advancing successive sinkers inwardly during the knitting wave so the corresponding needles will slide the facing yarn and the backing yarn downwardly in engagement with said shoulder portions to cause the facing yarn to appear on the exterior of the backing yarn, means for withdrawing successive sinkers at the end of the knitting wave as the corresponding needles are raised to cause the yarns to be positioned inwardly of the nibs, and means for subsequently again advancing successive sinkers inwardly as the needles are again lowered so the sinkers engage the fabric beneath their nibs, thereby serving as web holders as the needles are subsequently raised.

11. In a knitting machine having a cylinder provided with a plurality of vertically reciprocable latch needles and also having a throat gap, first means in the throat gap for feeding a facing yarn to the needles under relatively light tension, second means in the throat gap for feeding a backing yarn to the needles under relatively high tension at an elevation lower than that of the point of feeding the facing yarn, the point of feeding of the facing yarn being in advance of the point at which the backing yarn is fed, third means for feeding a wrap yarn to selected spaced needles under lesser tension than the tension in the facing yarn, and a sinker cooperating with each of the needles; the combination of a nib projecting upwardly from each of said sinkers and forming an outwardly and downwardly sloping shoulder portion and a platform inwardly of each of the nibs, means for advancing each successive sinker inwardly as the corresponding needle is lowered during the knitting wave, whereby the needles will slide the facing yarn, the backing and the wrap yarn downwardly against the sloping shoulder portions at those needles where the wrap yarn will appear to cause the wrap yarn to appear on the exterior of the facing yarn and to cause the facing yarn to appear on the outside of the fabric to cover the backing yarn at those needles where the wrap yarn is not fed thereto, means for withdrawing each successive sinker relative to the needles as the corresponding needle is lowered to position the yarns upon said platforms of the sinkers, means to subsequently advance the sinkers as the needles are again lowered to cause the fabric to be held by the nibs of the sinkers whereby, upon subsequent raising of the needles, the nibs cause the fabric to remain lowered as the latches of the needles pass upwardly beyond the same.

12. In a circular knitting machine having a throat gap and a needle cylinder provided with a plurality of vertically reciprocable needles and having a plurality of sinkers, all sinkers being reverse plating sinkers, a first yarn feed finger disposed against the lead side of the throat gap for feeding a facing yarn to the needles under relatively light tension, said first feed finger having its end nearest the needle circle terminating in an outwardly and downwardly sloping surface, said first feed finger having a feed eye whose axis is along one of the radii of the needle circle and disposed near the top of said sloping surface, a second yarn feed finger disposed against the trailing side of the first finger for feeding a backing yarn to the needles under relatively high tension and at a point lower than the point of feed of the facing yarn but substantially above the bottom of the throat gap; the combination of means for advancing the sinkers inwardly subsequent to the feeding of the yarns thereto to cause the yarns to be laid on the exterior of the shoulders of the reverse plating sinkers and slid down said shoulders during the knitting wave to cause the facing yarn, even though under less tension, to appear on the exterior of the fabric and next to the surface of the shoulders of the sinkers, a rotary shaft vertically disposed above the machine and driven in timed relation to the cylinder and having a plurality of yarn feed fingers for moving across the circle of needles and feeding warp yarn to selected needles under lesser tension than the tension present in the facing yarn, the wrap yarn being adapted to ride down the shoulders of the sinkers behind the facing yarn so that the wrap yarn will appear on the exterior of the fabric at those needles where the wrap yarn is fed thereto, means for withdrawing the sinkers at the end of the knitting wave to cause the yarns to be positioned inwardly of the nibs of the sinkers, and means to subsequently advance the sinkers to cause the fabric to be held by the nibs of the sinkers upon subsequent raising of the needles to prevent the knitted fabric from raising with the needles.

13. In a circular knitting machine having a throat gap and also having a plurality of vertically movable needles and also having a plurality of sinkers, all of said sinkers being substantially identical and each having a nib thereon, the combination of pattern controlled means for moving the sinkers inwardly to cause the yarns to be deposited onto and outwardly of the nibs thereof, means for feeding a facing yarn to the needles under relatively light tension and at a high elevation relative to the bottom of the throat gap, means in the throat gap for feeding a backing yarn to the needles under relatively high tension and at a lower level than the point of feeding the facing yarn and at a point on the trailing side of the first feeding means whereby during the knitting, the facing yarn will slide downwardly on the shoulders of the sinkers following the backing yarn which is under higher tension, pattern controlled means for moving said sinkers outwardly subsequent to the knitting wave to cause the yarns to be positioned inwardly of the nibs of the sinkers, means operable thereafter for moving the sinkers inwardly to hold the fabric under the nibs thereof to thereby permit the needles to be subsequently raised relative to the fabric, said last-mentioned means comprising a stationary segmental sinker clearing cam engageable with the back edges of said sinkers.

14. In a circular knitting machine having a needle cylinder provided with a plurality of vertically reciprocable latch needles and having a plurality of sinkers each having a butt and a nib thereon and each nib forming an outwardly and downwardly sloping shoulder, means for successively feeding a wrap yarn, a facing yarn and a backing yarn to selected needles at progressively lower elevations and at progressively lesser tensions and resilient means normally urging said sinkers inwardly; the combination of a pivoted radially movable central cam engageable by said butts for normally moving said sinkers outwardly at the feeding points of the facing and backing yarns, pattern controlled means for pivoting said central cam inwardly adjacent said last-named feeding points to permit said resilient means to advance each successive sinker inwardly as each corresponding needle is lowered during the knitting wave to cause the yarns to be slid down the shoulders of the sinkers to cause the facing yarn and the wrap yarn, even though under progressively less tension, to appear on the exterior of the fabric and next to the shoulders of the sinkers, a sinker throw-out cam for withdrawing each successive sinker outwardly to move the nib thereon past the yarns at the end of the knitting wave to cause the yarns to be deposited in front of the nibs of the sinkers as the needles are raised, and said throw-out cam being so positioned as to permit the resilient means to again advance each successive sinker as the needles are again lowered to cause the fabric to be held under the nibs of the sinkers whereby, upon subsequent raising of the needles, the latches thereof will move upwardly past the loops of the fabric.

15. That method of knitting a stocking on a circular knitting machine having vertically reciprocable needles and sinkers cooperating with said needles which includes successively feeding a facing yarn to the needles at a given elevation, feeding a backing yarn to the needles at a lower elevation than the facing yarn and under greater tension than the facing yarn, advancing each successive sinker inwardly while lowering each successive corresponding needle during the knitting wave to cause the yarns to engage the shoulders on the backs of the nibs of the sinkers and slide downwardly in engagement therewith, withdrawing each successive sinker while raising each successive corresponding needle at the end of the knitting wave sufficiently to cause the yarns to be positioned inwardly of the nibs of the sinkers, thereafter, lowering each successive needle to hold the yarns downwardly in front of the nibs of the sinkers, then advancing the sinkers inwardly to cause the nibs thereof to engage and hold the fabric, and then raising the needles to shed the loops of the fabric from the latches thereof.

16. That method of knitting a stocking on a circular knitting machine having vertically reciprocable needles and sinkers cooperating with said needles which includes successively feeding a facing yarn to each of the needles at a given elevation, feeding a backing yarn to each of the needles at a lower elevation than the facing yarn and under greater tension than the facing yarn, advancing each successive sinker inwardly while lowering each successive corresponding needle during the knitting wave to cause the yarns to engage the shoulders on the nibs of the sinkers and slide downwardly in engagement therewith, withdrawing each successive sinker while raising each successive corresponding needle at the end of the knitting wave sufficiently to cause the yarns to be positioned inwardly of the nibs of the sinkers, thereafter, lowering each successive needle to hold the yarns downwardly in front of the nibs of the sinkers, then advancing the sinkers inwardly to cause the nibs thereof to engage and hold the yarns, and then raising the needles to shed the yarns from the latches thereof.

17. That method of knitting a stocking on a circular knitting machine having a throat gap, vertically reciprocable needles and a reverse plating sinker cooperating with each of said needles which includes feeding a facing yarn to the needles under relatively light tension at the leading side of the throat gap and at a point near the top of the throat gap, and at a point in advance of the beginning of the knitting wave, feeding a backing yarn to the needles under relatively high tension at a point on the trailing side of the first feeding point and at a lower level than the facing yarn and at an elevation substantially above the bottom of the throat gap, advancing the sinkers inwardly to cause the yarns in the knitting wave to fall on the outwardly sloping shoulders of the sinkers during the knitting wave to thereby cause the facing yarn to be disposed next to the inside of the needle cylinder whereby it will appear on the outer face of the fabric in a looser manner than the backing yarn which will be knitted under greater tension, thereafter withdrawing the sinkers outwardly to cause the yarns to ride over and be deposited on the sinkers inwardly of the nibs as the needles are lowered, thereafter again advancing the sinkers inwardly to cause the fabric to be held by the nibs thereof, and thereafter moving the needles upwardly to shed the loops of the fabric from the latches of the needles.

References Cited in the file of this patent

UNITED STATES PATENTS

| Number | Name | Date |
|---|---|---|
| 1,977,590 | Page et al. | Oct. 16, 1934 |
| 2,063,026 | Bristow | Dec. 8, 1936 |
| 2,073,703 | Micks | Mar. 16, 1937 |
| 2,211,785 | Lawson et al. | Aug. 20, 1940 |